United States Patent [19]
Lustiger et al.

[11] Patent Number: 5,627,226
[45] Date of Patent: May 6, 1997

[54] POLYPROPYLENE/FIBER COMPOSITES

[75] Inventors: Arnold Lustiger, Edison; Cary N. Marzinsky, Stockton, both of N.J.; Yann Devorest, Lynchburg, Va.

[73] Assignee: Exxon Research & Engineering Company, Florham Park, N.J.

[21] Appl. No.: 552,714

[22] Filed: Nov. 3, 1995

[51] Int. Cl.$^6$ .......................................... C08K 5/34
[52] U.S. Cl. .................. 524/90; 524/99; 524/582; 524/583; 524/584; 524/579
[58] Field of Search ..................... 524/296, 321, 524/400, 90, 99, 582, 583, 584, 579

[56] References Cited

U.S. PATENT DOCUMENTS 3,853,808  12/1974  Sishikawa et al. .................. 260/42.18
5,231,126  7/1993  Shi et al. ................................ 524/296

*Primary Examiner*—Christopher Raimund
*Attorney, Agent, or Firm*—Joseph J. Dvorak

[57] ABSTRACT

A composite is provided having improved toughness without reduction in stiffness comprising a polymer matrix having fibers embedded therein wherein the polymer of the matrix is substantially beta polypropylene or a beta polypropylene-olefin copolymer. The composite is made by combining a nucleating agent with a polymer composition selected from the group consisting of alpha polypropylene, an alpha polypropylene-olefin copolymer, alpha polypropylene containing fibers therein and an alpha polypropylene-olefin copolymer having fibers therein, and when the polymer is polypropylene or polypropylene-olefin copolymer, also independently adding fiber to the polymer or copolymer and thereafter inducing nucleation whereby a composite of improved stiffness with no reduction in toughness is formed.

8 Claims, No Drawings

POLYPROPYLENE/FIBER COMPOSITES

FIELD OF THE INVENTION

The present invention relates to the field of composites and more particularly to polypropylene/fiber composites with improved mechanical properties.

BACKGROUND OF THE INVENTION

By definition, composite materials include two or more phases having different physical characteristics. Many composites incorporate fibers, typically of a relatively rigid material, in a matrix of another material which ordinarily is less rigid. For example, polymers are often reinforced with fibers of glass, ceramic or carbon, whereas metals may be reinforced with ceramic fibers.

One polymer used in commercial composite structures is isotactic polypropylene. As is known, isotactic polypropylene can take on a number of crystal forms. The most common of these crystal forms is the monoclinic or "alpha" form, and this crystal form is predominant in most commercially processed isotactic polypropylene composites. A second form of isotactic polypropylene that has been widely documented in the literature is the hexagonal or "beta" form. This form, which can be induced through the incorporation of red quinacridone pigments to a polypropylene melt, has a lower stiffness and higher toughness that the alpha form. Purportedly, the beta form of polypropylene is useful in forming films and thermoforming articles from such films.

Composites, of course, present unique problems not encountered with uniform, single phase materials and the design of a composite material often involves balancing competing considerations. For example, there is an inverse relationship between stiffness and toughness in a polymer/fiber composite. The strength and stiffness in composites containing a given fiber reinforcement is directly related to the strength of the bond between the fiber and the polymer matrix. On the other hand, toughness is inversely related to the strength of the fiber-matrix bond. This tradeoff between strength and toughness is a major concern to those who develop and design with these materials.

Attempts have been made to enhance the performance of composites by providing an "interphase" between the fibers and the surrounding matrix material. As distinguished from an interface of molecular scale dimensions, an interphase constitutes a distinct phase having physical properties different from those of the fiber and different from those of the matrix. One method for making such a composite, as disclosed in U.S. Pat. No. 5,288,555, is to coat the fiber material with a nucleating agent and then process the coated fiber with the base polymer. A suggested polymer is polypropylene and a suggested nucleating agent is a quinacridone pigment, in which case the net result after processing is a composite in which the material is alpha polypropylene and the fibers in the matrix are coated with an interphase of beta polypropylene.

SUMMARY OF THE INVENTION

Surprisingly, it has been discovered that the toughness of a fiber reinforced polypropylene composite can be increased without reducing its stiffness by adding a beta nucleant to the polypropylene of the composite.

Thus, in one embodiment of the present invention a composite is provided having improved toughness without reduction in stiffness comprising a polymer matrix having fibers embedded therein wherein the polymer of the matrix is substantially beta polypropylene or a beta polypropylene-olefin copolymer.

Another embodiment of the present invention comprises a method of forming the novel composite by combining a nucleating agent with a polymer composition selected from the group consisting of alpha polypropylene, an alpha polypropylene-olefin copolymer alpha polypropylene containing fibers therein and an alpha polypropylene-olefin copolymer having fibers therein, and when the polymer is polypropylene or polypropylene-olefin copolymer, also independently adding fiber to the polymer or copolymer and thereafter inducing nucleation whereby a composite of improved stiffness with no reduction in toughness is formed.

DETAILED DESCRIPTION OF THE INVENTION

The polymer used in forming the composite of the present invention may be a homopolymer of polypropylene or a copolymer of polypropylene with an olefin such as ethylene or an alpha olefin having from about 4 to 8 carbon atoms. When the co-polymer is used generally it will contain about 5 to about 10 wt % of the olefin. Also, the polymer or copolymer will be predominately in the alpha crystal form and preferably will have a number average molecular weight in the range of about 15,000 to about 100,000.

The fibers useful in the present invention include glass, carbon and ceramic fibers; however, glass fibers are preferred. These fibers may be continuous or discontinuous; but typically discontinuous fibers of about ½ inch to 1-½ inches in length are used.

The amount of fiber used can vary broadly. Typically from about 5 wt. % to about 60 wt. % based on the weight of polymer will be used and preferably from 30 wt. % to 45 wt. % will be used.

By beta nucleating agent is meant that any material capable of inducing the formation of the beta crystal form of the polymer from the alpha form. Nucleating agents useful in this invention include the gamma-crystalline form of a quinacridone colorant, equal amounts of pimelic acid and calcium stearate (at 0.1 weight percent in the polypropylene) and a grey leuco sulfuric acid ester indigoid pigment known as Indigosol. Nucleating agents are usually employed in powder form. Quinacridone is the preferred nucleating agent and the most preferred is red quinacridone dye having the formula:

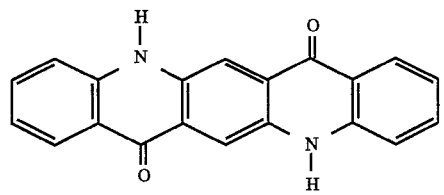

The nucleating agent is used in an amount ranging from about 1 to about 5000 ppm based on the weight of polymer and preferably from about 50 to 200 ppm.

The composite is prepared by combining the nucleating agent, polymer and fiber using conventional blending devices and thereafter inducing nucleation.

Typically, the polymer is first blended with the nucleating agent and thereafter the fiber is added; however, all the individual components can be combined in a single step or the nucleating agent can be combined with the polymer fiber by combining the polymer.

After combining the various components, including any other desirable additives such as antioxidants, pigments and the like, the mixture is heated to a temperature sufficient to melt the polymer and then cooled to a temperature sufficient to form the beta crystal form of the polymer. The precise temperature will depend upon the polymer used. For polypropylene of melt flow rate of 400 ($M_n$=23,800, $M_w$=82,400) the polymer will be heated to a temperature above the melting point and cooled to at least 125° C. to induce formation of the beta crystal form.

Composites formed in accordance with the present invention comprise a polymer matrix that is substantially the beta form of the propylene containing polymer with the fibers imbedded therein.

As is known the relative amounts of alpha and beta forms in a polypropylene sheet can be determined by comparing the three strongest alpha phase x-ray diffraction peaks with the strong beta phase peak. An empirical parameter known as "K" can be derived from those peaks by the equation.

$K=(H_{300})/[(H_{300})+(H_{040})+(H_{130})]$. The composites of the present invention will have a value of K in the range of about 0.2 to 0.95.

EXAMPLES

Example 1

This example illustrates the effect of beta nucleation on toughness of a polypropylene polymer.

Various quinacridone red pigments were secured from commercial sources. E3B was obtained from Hoechst and RT359 from Ciba Geigy.

The pigment was dry blended at 100 ppm with a 400 MFR polypropylene ($M_w$=80,000), extruded, and compression molded into appropriately rigid disks for x-ray diffraction measurement. The compression molding involved melting to 180° C. between two plates for 2 months and subsequent quenching between two water cooled plates. The K value for the x-ray appears below:

| Resin Blend | K Value |
| --- | --- |
| Unmodified | 0.122 |
| E3B | 0.790 |
| RT359 | 0.880 |

Adding the pigment to the polypropylene alone, no effect on toughness was noted (stiffness could not be measured because of the extreme brittleness of the material). This data appears below.

| Resin Blend | Izod Impact Strength (Toughness) (ft-lbs/in) |
| --- | --- |
| Unmodified | 0.17 + −.03 |
| 100 PPM E3B | 0.18 + −.04 |
| 100 PPM RT359 | 0.15 + −.01 |

Example 2

In this example, 100 PPM RT359 was added to a glass reinforced polypropylene (40% fiberglass) composite containing 400 MFR isotactic polypropylene was in a compression mold to 250° C. and then removed to a quench press at 250° C. The quinacridone was found to surprisingly improve the toughness of the composite with no loss in flexural strength or stiffness (modulus). The data below is for an average of two runs.

|  | Regular Composite Composition | +100 PPM RT359 |
| --- | --- | --- |
| Flexural Modulus | 4450 MPa | 5082 MPa |
| Flexural Strength | 142 MPa | 158 MPa |
| Tensile Strength | 103 MPa | 104 MPa |
| Izod Impact Strength | 88 KJ/sq.m. | 102 KJ/sq.m |

What is particularly surprising is that although the polymer itself showed no improvement in toughness (i.e., impact strength) when combined with quinacridone, the composite does. In addition, the ubiquitous trade-off of strength/stiffness and toughness appears here to have been obviated. Toughness was found to increase accompanied by no decrease, in flexural strength and stiffness.

The K-value for the regular composition was 0.077 versus 0.295 for the composition containing 100 PPM RT 359.

Example 3

In this example, a composite was prepared by dispersing glass fibers (13 mm long) in water. Then polypropylene powder and 100 ppm of RT359 was dispersed with the glass fibers. The glass and the polypropylene constitute 0.1% of the total dispersion. The dispersion then was deposited on a porous screen and dewatered thereby forming a sheet. The sheet was dried for 5 minutes in a hot air oven. It was then predensified at 250° C. for 3.5 minutes followed by cooling for 3.5 minutes under pressure at ambient temperature. Finally, it was fully densified in a double band press at 250° C. for 4.5 minutes and at 60° C. for 2 minutes to provide a composite according to the invention.

What is claimed is:

1. A method of forming a composite having improved stiffness without reduction in toughness comprising:

providing a polypropylene polymer selected from the group consisting of polypropylene homopolymer, a polypropylene-olefin copolymer containing up to about 10 weight percent olefin, a polypropylene homopolymer having fibers dispersed therein and a polypropylene-olefin copolymer containing up to about 10 weight percent olefin having fibers dispersed therein;

combining a beta-nucleating agent with the polypropylene polymer in an amount ranging from about 50 to about 200 ppm based on the weight of polymer, the nucleating agent being capable of inducing the beta crystal form of the polypropylene polymer;

adding fibers to the polymer if the polymer does not already have fibers dispersed therein; and inducing nucleation whereby a composite of improved stiffness with no reduction in toughness is formed.

2. The method of claim 1 wherein nucleation is induced by heating the polymer, fiber and nucleating-agent to the polymer melting point and then allowing the polymer to cool to a temperature sufficient for nucleation to occur.

3. The method of claim 1 wherein the polypropylene or polypropylene-olefin copolymer has a number average molecular weight in the range of about 15,000 to 100,000 and the olefin of the copolymer is ethylene or an alpha olefin of from 4 to about 8 carbon atoms.

4. The method of claim 1 wherein the polymer is polypropylene and the fiber is glass.

5. A composite made by the process of claim 1 wherein said composite has a K value in the range of about 0.2 to 0.95.

6. The composite of claim 5 wherein the olefin of the copolymer is ethylene or an alpha olefin of from 4 to 8 carbon atoms.

7. The composite of claim 5 wherein the polymer has a number average molecular weight in the range of from about 15,000 to about 100,000.

8. The composite of claim 5 wherein the matrix is polypropylene homopolymer and the fiber is glass.

* * * * *

UNITED STATES PATENT AND TRADEMARK OFFICE
CERTIFICATE OF CORRECTION

PATENT NO. : 5,627,226
DATED : May 6, 1997
INVENTOR(S) : Lustiger, et al.

It is certified that error appears in the above-identified patent and that said Letters Patent is hereby corrected as shown below:

Column 4, line 43, please delete the first word "stiffness" should read --toughness--.

Column 4, line 43, please delete the fifth word "toughness" should read --stiffness--.

Signed and Sealed this

Second Day of May, 2000

*Attest:*

Q. TODD DICKINSON

*Attesting Officer*      *Director of Patents and Trademarks*